US007711062B2

(12) United States Patent
Hen

(10) Patent No.: US 7,711,062 B2
(45) Date of Patent: May 4, 2010

(54) DECODING METHODS AND APPARATUS FOR MIMO COMMUNICATION SYSTEMS

(75) Inventor: Ilan Hen, Haifa (IL)

(73) Assignee: Intel Corporation, Santa Clara, CA (US)

(*) Notice: Subject to any disclaimer, the term of this patent is extended or adjusted under 35 U.S.C. 154(b) by 677 days.

(21) Appl. No.: 11/618,671

(22) Filed: Dec. 29, 2006

(65) Prior Publication Data

US 2008/0159429 A1 Jul. 3, 2008

(51) Int. Cl.
*H04B 7/08* (2006.01)
*H04L 23/02* (2006.01)

(52) U.S. Cl. .................................. 375/267; 375/262
(58) Field of Classification Search ................ 375/262, 375/265, 267, 340, 341, 347; 455/66.1, 272
See application file for complete search history.

(56) References Cited

U.S. PATENT DOCUMENTS

| 2004/0028254 | A1 | 2/2004 | Bachmann et al. | |
|---|---|---|---|---|
| 2004/0208254 | A1 | 10/2004 | Lee et al. | |
| 2005/0157811 | A1 | 7/2005 | Bjerke et al. | |
| 2007/0121753 | A1* | 5/2007 | Mcnamara et al. | 375/267 |
| 2008/0049863 | A1* | 2/2008 | Heiskala | 375/267 |
| 2008/0298225 | A1* | 12/2008 | Oh et al. | 370/206 |

FOREIGN PATENT DOCUMENTS

WO WO-2008082909 A1 7/2008

OTHER PUBLICATIONS

"International Application Serial No. PCT/US2007/087499, PCT Search Report mailed May 6, 2008", 3.
"International Application Serial No. PCT/US2007/087499, PCT Written Opinion mailed May 6, 2008", 5.
Zhang, H., et al., "On low complexity ML detection alogrithm in MIMO system", In: *Vehicular Technology Conference*,2005, VTC 2005-Spring. 2005 IEEE61st vol. 1, May 30-Jun. 2005, 486-489.
Lenstra, A. K., et al., "Factoring Polynomials with Rational Coefficients", *Mathematische Annalen*, 261, (1982), 515-534.
Silvola, P., et al., "Suboptimal Soft-Output MAP Detector With Lattice Reduction", *IEEE Signal Processing Letters*, 13(6), (2006), 321-324.
Yao, H., et al., "Lattice-Reduction-Aided Detectors for MIMO Communication Systems", *IEEE Global Telecommunications Conference, GLOBECOM '02*, vol. 1, (2002), 424-428.

* cited by examiner

*Primary Examiner*—Young T. Tse
(74) *Attorney, Agent, or Firm*—Schwegman, Lundberg & Woessner, P.A.

(57) ABSTRACT

Methods and apparatus are described herein to provide for the decoding of signals in a MIMO communications system. Other embodiments may include a method of deriving a list of possible data vectors and corresponding metrics given a received signal vector and provide the list to a soft bits calculator. Further embodiments include a decoding apparatus that includes a shift and scale module, a linear receiver module, a list generator module and a lattice reduction module. The decoding apparatus may additionally include a soft bits calculator, in further embodiments.

22 Claims, 3 Drawing Sheets

US 7,711,062 B2

DECODING METHODS AND APPARATUS FOR MIMO COMMUNICATION SYSTEMS

TECHNICAL FIELD

Various embodiments described herein relate generally to wireless communications and more particularly for decoding methods and apparatus for MIMO communication systems.

BACKGROUND

Computing devices have become a ubiquitous part of every user's daily life. Whether wireless or wired, these devices have increased the daily productivity of those users. In the wireless realm, a cell phone, Wireless Fidelity (Wi-Fi) capable laptop, a wireless broadband connection for their home, or wireless enabled Personal Digital Assistant (PDA), enables the user to be connected to a wireless network continually. During the past decade it was well established that communications systems employing MIMO architecture, architecture in which transmission and reception are carried out through multiple antennas, are superior systems with respect to reliability, throughput, and power consumption.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of embodiments of the invention, reference is made to the accompanying drawings which form a part hereof, and in which are shown, by way of illustration, specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed.

Figure 1:
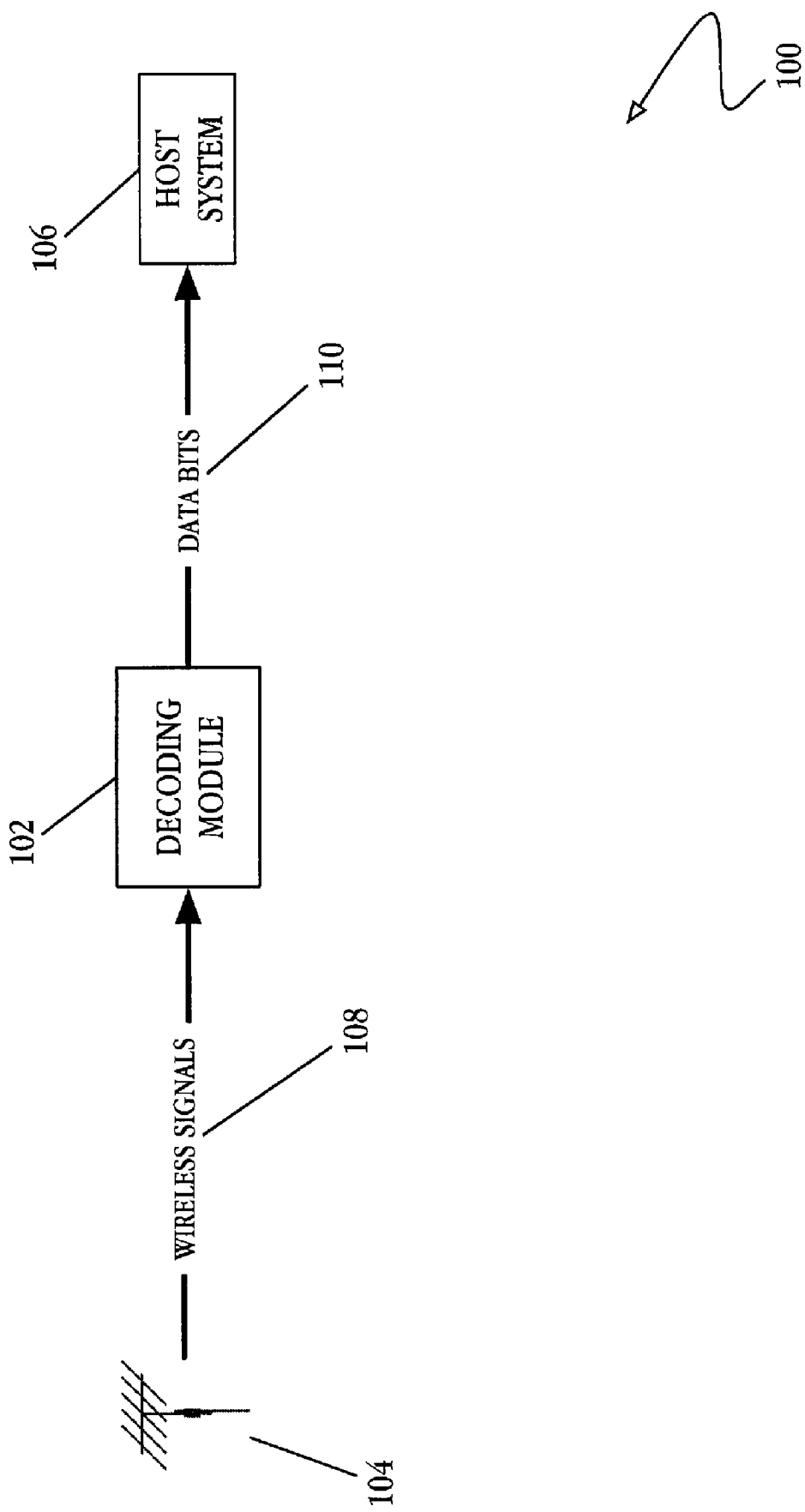
FIG. 1 shows a high level block diagram of a wireless communications system according to embodiments of the present invention.

FIG. 1 is a high level block diagram of a wireless communications system according to embodiments of the present invention. In an embodiment, a wireless communications system 100 includes a decoding module 102, a plurality of transmit antennas 104 and a host device 106. For the purposes of illustration in the present discussion a 2×2, two transmit antennas and two receive antennas, MIMO system will be used, though the apparatus and methods disclosed herein are equally applicable to any arrangement of a MIMO system. Wireless signals received by the plurality of receive antennas may differ due to the spatial separation of the antennas, which may also lead to temporal differences. The decoding module 102, in one embodiment, is configured to receive the various wireless signals 108 from the plurality of receive antennas as a set of signal vectors and output a stream of possible soft data bits 110 to the host device 106.

In an embodiment, the decoding module 102 is configured to decode an encoded wireless signal 108 and to derive soft data bits 110 contained within the encoded wireless signal 108. In one embodiment, the encoded wireless signal may be received from a network through the plurality of receive antennas. Encoded, as used herein, is meant to denote a signal which can not be operated on directly by the host system 106, and requires intermediary operations to derive data bits which can be operated on directly by the host system 106. In the context of the present discussion, the intermediary operations are performed by the decoding module 102, and are collectively called decoding operations. The encoded wireless signal 108 is a sum of the original data and noise received by the plurality of antennas. Noise is considered to be anything received by the antenna which is not part of the data intended to be transmitted, and may also be called interference. As the original data may be affected by the channel matrix, for a MIMO system the encoded wireless signal can further be expressed as the sum of the original data as transformed by the channel matrix and the noise. One of the goals of the decoding module is to remove the noise to determine, with reasonable probability, the original data transmitted. The decoding module, in some embodiments, provides to the host device a soft approximation of the original data bits transmitted.

Figure 2:
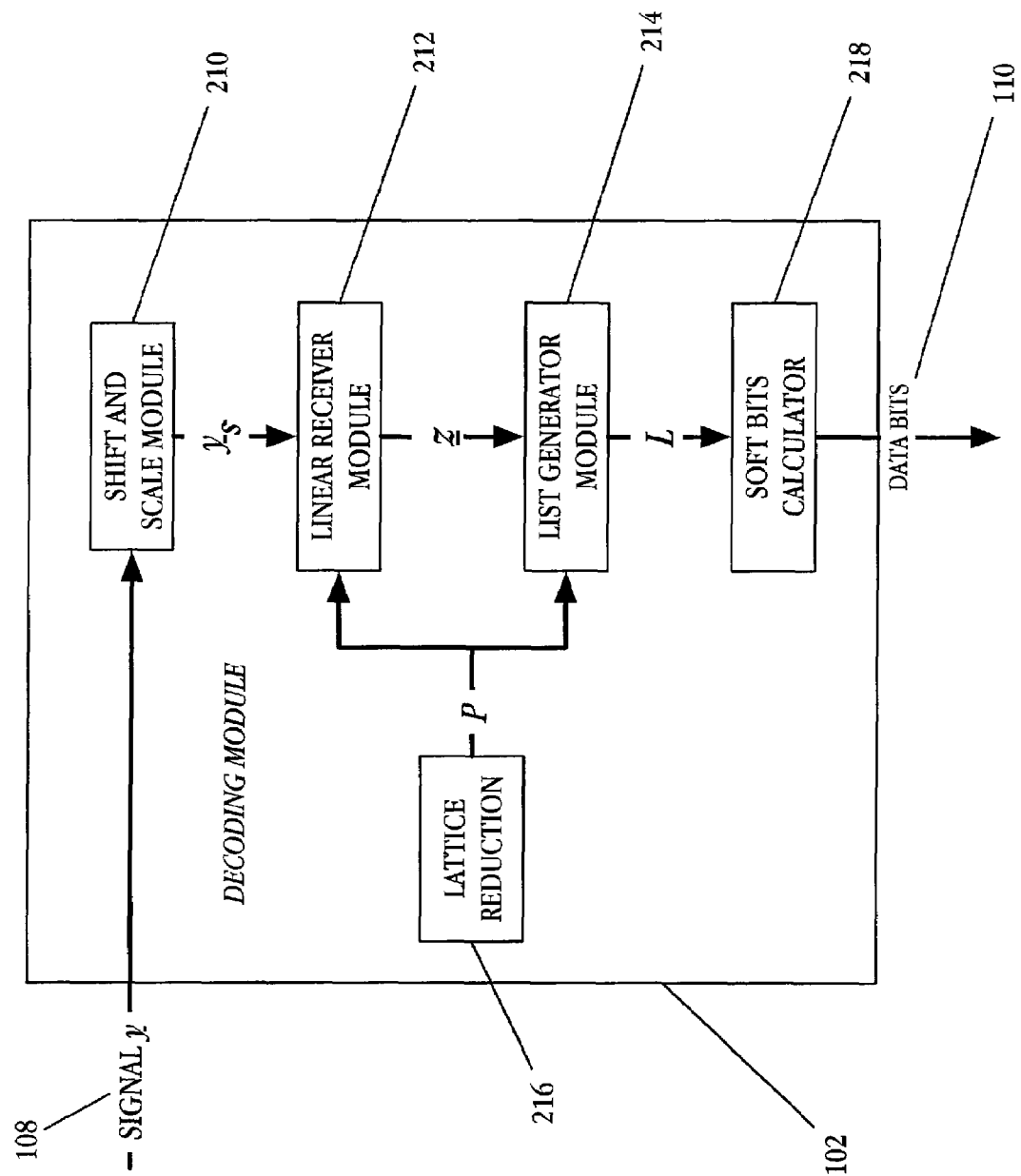
FIG. 2 shows a high level block diagram of an apparatus according to embodiments of the present invention.

FIG. 2 is a high level block diagram of an apparatus according to embodiments of the present invention. In an embodiment, the decoding module 102 includes a shift and scale module 210, a linear receiver module 212, a list generator module 214 and a lattice reduction module 216. In a further embodiment, the decoding module 102 includes a soft bits calculator 218.

In an embodiment, the lattice reduction module 216 is coupled to the linear receiver module 212 and the list generator module 214 and is configured to provide to both the linear receiver module 212 and the list generator module 214 a matrix P which is derived from the channel matrix H. P is derived from H through the well known LLL (Lenstra-Lenstra-Lavosz) algorithm modified to account for complex-valued matrices.

In an embodiment, the shift and scale module 210 is coupled to the receive antennas and is configured to receive an input signal vector, $\underline{y}$, and transform the signal vector into the complex vector space. In a further embodiment, the shift and scale module 210 performs a linear transform on $\underline{y}$ into complex vector space which is operable on by the list generator module 214, as will be described below. The output vector $\underline{y}_s$ is a linear transform of the input vector from the QAM vector space into the continuous-integers complex vector space, and can be provided for by the following equation:

$$\underline{y}_s = 0.5\underline{y} + 0.5H \cdot (\underline{1} + \underline{j}).$$

In an embodiment, the linear receiver module 212 is coupled to the shift and scale module 210 and the list generator module 214, and is configured to remove the correlation among the components of the output vector from the shift and scale module 210. In a further embodiment, the linear receiver 212 is configured to multiply the vector By $\underline{y}_s$ by arbitrary matrix A, which can be expressed as:

$\underline{z} = A\underline{y}_s$

In the specific example for the zero-forcing linear receiver:

$\underline{z} = (\tilde{H} \cdot \tilde{H})^{-1} \tilde{H} \cdot \underline{y}_s$ where $\tilde{H}=HP$. In a further embodiment, the linear received module performs a a linear operation on the signal y received through two or more antennas using a matrix P and generates the z value, where the matrix P is generated using a lattice reduction algorithm performed on a channel matrix for a MIMO channel In an embodiment, the list generator module 214 is coupled to the linear receiver module 212 and is configured to receive a vector from the linear receiver module 212 and to derive a list of possible data vectors through operations where the complex components of the received vector are approximated by complex integers in the complex plane. In a further embodiment, the list generator module 214 discards possible data vectors where that data vector contains illegal QAM symbols. Specific operations of the list generator module 214 will be explained in greater detail below with reference to FIG. 3.

The soft bits calculator module 218, in one embodiment, is coupled to the list generator module 214 and receives a list of possible data vectors and a corresponding metric for each of the possible data vectors. The soft bits calculator module 218, through standard operations, provides soft approximation of the original data bits. The soft bits calculator 220, in a further embodiment, provides soft approximation of the original data bits to the host system 106 for further operations. The soft bits calculator module 218 calculates the original data, in one embodiment, according to:

$\tilde{b}_{i,j}^{LR} = \min D_{i,j}^0 - \min D_{i,j}^1$, where, $D_{i,j}^0$ and $D_{i,j}^1$ are the corresponding metrics contained within the output of the list generator module 214.

Figure 3:
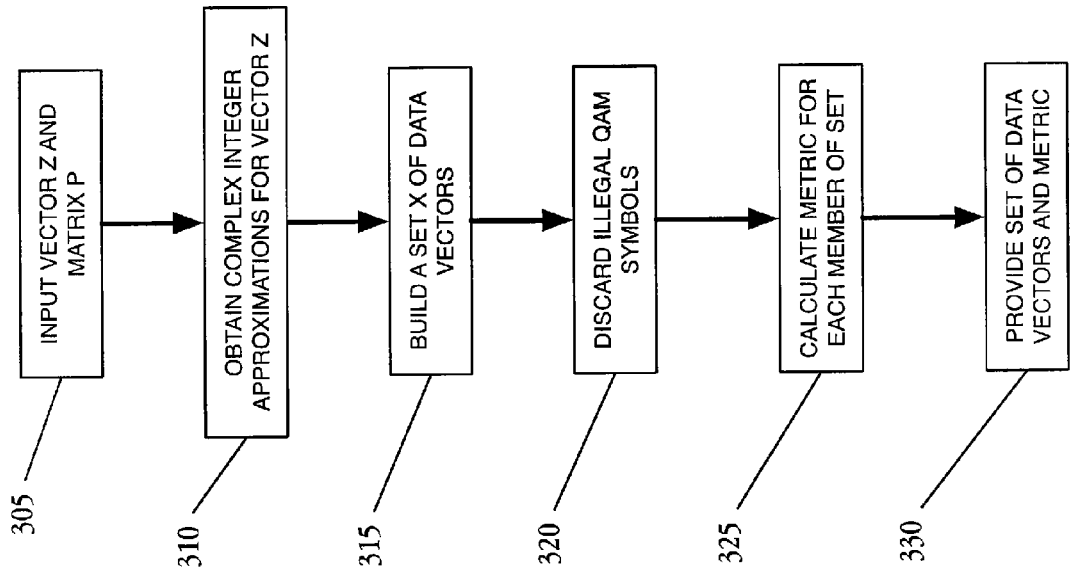
FIG. 3 shows a flowchart of a method according to embodiments of the present invention.

FIG. 3 shows a flowchart of a method according to embodiments of the present invention. In an embodiment, the operations depicted in FIG. 3 may be carried out in a decoding module 102 as shown and described above. In a further embodiment, the operations depicted in FIG. 3 are carried out in a list generator module 214 such as that described above with respect to FIG. 2.

At block 305, the vector z is received from the linear receiver module 212, the matrix P, and the reduced channel matrix H, are received from the lattice reduction module 216, and are input. In an embodiment, the vector z is defined by the equation:

$\underline{z} = A\underline{y}_s$, where A is an arbitrary matrix.

At block 310, integer approximations from vector z are obtained. In one embodiment, the integer approximations are carried out on component-by-component basis on the components of the vector $\underline{z}$. The number of complex integer approximations of each of the components adaptively varies. The adaptive nature of this operation yields a small number of candidate vectors to be selected and processed. This is in opposition to the maximum likelihood (ML) decoding operation in which the complexity of the operation grows exponentially fast with the number of transmit antennas and the constellation size. In a further embodiment, obtaining the complex integer approximations from the complex components of the vector z is accomplished by the following operations. Set M positive integers that satisfy $$\prod_{i=1}^{M} S_i = S$$

where S is a predetermined parameter that establishes the complexity of the decoder. Further define M sets of complex numbers $A_1, A_2, \ldots, A_M$ where $|A_i|=S_i$, $i=1, \ldots, M$ and $|A_i|$ denotes the size of the set $A_i$. Each set $A_i$ contains the complex integer round($z_i$) and the additional $S_i-1$ closest integers to $z_i$. $S_1, S_2, \ldots, S_m$ may be determined in either an adaptive manner, or a non-adaptive manner. For the non-adaptive process $S_1$ is set by $$S_1 = S_2 = \cdots = S_M = S^{\frac{1}{M}}.$$

For the adaptive process, quantization errors are calculated by $\epsilon_i = |z_i - \text{round}(z_i)|$, $i=1, \ldots, M$ and small set sizes are allocated to small quantization errors in ascending order.

At block 315, a set X of possible data vectors is constructed. The set X is constructed by first defining a set U that consists of S vectors, which are the approximations to the vector z. The set X of possible data vectors is obtained from U after scaling operations using the matrix P. The set U (with S vectors of size M) can be defined as:

$U = A_1 \times A_2 \times \ldots \times A_M$.

At block 320, the elements of set X are scanned for those vectors that may contain illegal QAM symbols. This narrows the set of possible data vectors, thereby speeding up the process of finding the probably original data signal. The reduced set X can be defined as $X_p$.

At block 325, a metric for each element of $X_p$ is calculated. The metric, in one embodiment, can be defined as the distance between each of the possible data vectors in the reduced set and the original vector z. The metric can be calculated by the equation:

$d = \|\tilde{H}(\underline{z}-\underline{x})\|^2$.

At block 330, the list of possible data vectors and its corresponding metric are combined into a single set and provided to the soft bits calculator for further operations. The soft bits calculator can use any method for reasonable determining the original data contained within the signal without departing from the scope of the present discussion, and any soft bits calculator, as are well known in the art, may be used.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

What is claimed is:

1. A receiver for a MIMO communications system, comprising:
    a linear receiver module to perform a linear operation on a signal y received through two or more receiving antennas using a matrix P to generate a z value, wherein the matrix P is generated using a lattice reduction algorithm performed on a channel matrix for a MIMO channel; and
    a list generator module to receive the z value from the linear receiver module and the matrix P and to generate a list of possible data vectors and metrics from the received signal by scaling a matrix of complex integer approximations of a plurality of complex components of a vector z, wherein the list is generated by operations in a complex domain.

2. The receiver of claim 1, further comprising:
    a soft bits calculator to provide a stream of soft bits to a host device, wherein the soft bits are derived from the list of possible data vectors and metrics.

3. The receiver of claim 1, wherein the list generator module retains data vectors corresponding to quadrature amplitude modulation (QAM) symbols and discards data vectors that do not correspond to valid QAM symbols.

4. The receiver of claim 1, wherein the lattice reduction algorithm used by the linear receiver module is the Lenstra-Lenstra-Lavosz (LLL) algorithm modified to account for complex-valued matrices.

5. The receiver of claim 1, wherein the list generator module is configured to:
    obtain the complex integer approximations from the vector z, wherein the vector z is derived from a lattice reduction on the channel matrix H and the linear operation on the signal y;
    build a set X of possible data vectors, wherein the set X is constructed by first defining a set U of S vectors, the S vectors are approximations of the complex components of the vector z, and then scale the set U with the matrix P, obtained from the lattice reduction on the channel matrix H;
    generate a metric for each element of the set X of possible data vectors; and
    provide the resulting set X of possible data vectors and the metric for each element of the set X to a calculating module, wherein the calculating module is configured to generate a list of probably data bits contained within the signal y.

6. The receiver of claim 1, wherein the liner receiver module performs the linear operation using the Lenstra-Lenstra-Lavosz (LLL) algorithm on the channel matrix of the MIMO channel.

7. A method for decoding signals received through two or more receiving paths, the method comprising:
    obtaining a plurality of complex integer approximations from a vector z, wherein the vector z is derived from a lattice reduction on a channel matrix H and a linear receiver operation on a signal y;
    building a set X of possible data vectors, wherein the set X is constructed by first defining a set U of S vectors, the S vectors are composed of approximations of a plurality of complex components of the vector z, and then scaling the set U with the lattice reduction derived a matrix P;
    generating a metric for each element of the set X of the possible data vectors; and
    providing the resulting set X of possible data vectors and the metric for each element of the set X to a calculating module, wherein the calculating module is configured to generate a soft approximation of the data bits contained within the signal y.

8. The method of claim 7, wherein the linear receiver operation is performed on both the signal y and the matrix P derived using a lattice reduction algorithm on the channel matrix H.

9. The method of claim 8, wherein the matrix P is generated using the Lenstra-Lenstra-Lavosz (LLL) algorithm on the channel matrix H.

10. The method of claim 7, wherein the resulting set X of the possible data vectors does exclude elements that are invalid QAM symbols.

11. The method of claim 7, wherein the vector z of size M is created in an adaptive manner, wherein quantization errors are calculated by $\epsilon_i = |z_i - \text{round}(z_i)|$, $i = 1, \ldots, M$ and small set sizes are allocated to small quantization errors in ascending order.

12. The method of claim 7, wherein the vector z of size M is created in a non-adaptive manner and a predetermined parameter $S_1$ is set by $$S_1 = S_2 = \cdots = S_M = S^{\frac{1}{M}}.$$

13. The method of claim 7, wherein the resulting set X of the possible data vectors and a corresponding metric for each element of the resulting set X is provided to a soft bits calculator and is adapted to be used by the soft bits calculator to produce a stream of possible data bits.

14. A MIMO communications system, the system comprising:
    a constellation of multiple transmit and receive antennas; and
    a decoding module coupled to the constellation of multiple transmit and receive antennas, the decoding module including:
        a linear receiver module to perform a linear operation on a signal y received through two or more receiving antennas using a matrix P to generate a z value, wherein the matrix P is generated using a lattice reduction algorithm performed on a channel matrix for a MIMO channel; and
        a list generator module coupled to the linear receiver module to receive the z value from the linear receiver module and the matrix P and to generate a list of possible data vectors and metrics from the received signal by scaling a matrix of complex integer approximations of a plurality of complex components of a vector z, wherein the list is generated by operations in a complex domain.

15. The system of claim 14, wherein the decoding module further includes:
    a soft bits calculator to provide a stream of soft bits to a host device, the stream of soft bits derived from the list of possible data vectors and metrics.

16. The system of claim 14, wherein the list generator module retains data vectors corresponding to quadrature amplitude modulation (QAM) symbols and discards data vectors that do not correspond to valid QAM symbols.

17. The system of claim 14, wherein the lattice reduction algorithm used by the linear receiver module is the Lenstra-Lenstra-Lavosz (LLL) algorithm modified to account for complex-valued matrices.

18. The system of claim 17, wherein the LLL algorithm operates in a real domain.

19. The system of claim 17, wherein the LLL algorithm operates in the complex domain.

20. The system of claim 14, wherein the list generator module is configured to:
   obtain the complex integer approximations from the vector z, wherein the vector z is derived from a lattice reduction on the channel matrix H and the linear operation on the signal y;
   build a set X of possible data vectors, wherein the set X is constructed by first defining a set U of S vectors, the S vectors are composed of approximations of the complex components of the vector z, and then scale the set U with the matrix P;
   generate a metric for each element of the set X of possible data vectors; and
   provide the resulting set X of possible data vectors and the metric for each element of the set X to a calculating module, wherein the calculating module is configured to generate a list of probably data bits contained within the signal y.

21. The system of claim 14, wherein the list generator module generates the list of possible data vectors of size M adaptively, wherein quantization errors are calculated by $\epsilon_i = |z_i - \mathrm{round}(z_i)|$, $i=1, \ldots, M$ and small set sizes are allocated to small quantization errors in ascending order.

22. The system of claim 14, wherein the list generator module generates the list of possible data vectors of size M non-adaptively and a predetermined parameter $S_1$ is set by $$S_1 = S_2 = \cdots = S_M = S^{\frac{1}{M}}.$$

* * * * *